(12) United States Patent
Dai et al.

(10) Patent No.: US 9,079,687 B2
(45) Date of Patent: Jul. 14, 2015

(54) HANDLE UNIT OF A DETACHABLE GRILLING PAN

(71) Applicant: TSANN KUEN (ZHANGZHOU) ENTERPRISE CO., LTD., Zhang Zhou, Fujian (CN)

(72) Inventors: Zhiqiang Dai, Zhang Zhou (CN); Yu-Cheng Chen, Keelung (TW)

(73) Assignee: TSANN KUEN (ZHANGZHOU) ENTERPRISE CO., LTD., Zhang Zhou (CN)

( * ) Notice: Subject to any disclaimer, the term of this patent is extended or adjusted under 35 U.S.C. 154(b) by 0 days.

(21) Appl. No.: 14/162,162

(22) Filed: Jan. 23, 2014

(65) Prior Publication Data

US 2014/0217110 A1    Aug. 7, 2014

(30) Foreign Application Priority Data

Feb. 4, 2013    (CN) ...................... 2013 2 0067573 U (51) Int. Cl.
*B65D 25/28* (2006.01)
*A47J 37/10* (2006.01)
*A47J 45/07* (2006.01)

(52) U.S. Cl.
CPC ............... *B65D 25/28* (2013.01); *A47J 37/108* (2013.01); *A47J 45/071* (2013.01)

(58) Field of Classification Search
CPC ........ B65D 25/28; B65D 25/22; A47J 37/108; A47J 45/07; A47J 45/071; A47J 45/08; A47J 45/085
USPC .......... 220/756, 326, 759; 292/137, 163, 177, 292/DIG. 37; 99/372
See application file for complete search history.

(56) References Cited

U.S. PATENT DOCUMENTS

| | | | |
|---|---|---|---|
| 6,472,644 B1 * | 10/2002 | Wu | 219/450.1 |
| 2008/0216669 A1 * | 9/2008 | Kuo et al. | 99/372 |
| 2009/0322191 A1 * | 12/2009 | Chang et al. | 312/223.1 |

* cited by examiner

*Primary Examiner* — Stephen Castellano
(74) *Attorney, Agent, or Firm* — Rabin & Berdo, P.C.

(57) ABSTRACT

A handle unit of a detachable grilling pan includes: a lock element, which is disposed in the body of the grill; and a handle module, which is disposed in the grilling pan of the grill; thereinto, the handle module having a housing, a lock catch element and a repositioning element, the lock catch element is movably forward and backward laterally disposed inside the housing, one end of the lock catch element is disposed with a catch portion, the catch portion extends out of the housing, the repositioning element abuts against the lock catch element and the housing therebetween, the catch portion is locked to the lock element. The catch portion is locked to the lock element. To disassemble the grilling pan, pressing the lock catch element laterally to detach the lock element and the lock catch element.

12 Claims, 15 Drawing Sheets

HANDLE UNIT OF A DETACHABLE GRILLING PAN

FIELD OF THE INVENTION

The present invention relates to a handle unit of a detachable grilling pan, especially to a handle unit of a detachable grilling pan on a grill.

BACKGROUND OF THE INVENTION

The housing of existing detachable grill is a box made of insulation material, the end face of the housing is disposed with a reflector made of metal, the center of the reflector is opened with a window, the window is disposed with a material heat conductive block. The heat conductive block, the reflector and the housing form a closed space. An electric heater is disposed inside the closed space, the electric heater is fixed to the heat conductive block. The external surface of the heat conductive block is detachable to the grilling pan. To clean the grilling pan, taking the grilling pan from the heat conductive block of the housing to clean the upper surface of the grilling pan.

As the temperature of the grilling pan is high, for convenient to hand the grilling pan and to avoid the scald, two sides of the grilling pan are respectively disposed with a handle extending out, so that people hand the two handles by hand to carry the grilling pan up or to put the grilling pan to the housing.

However, when the grill is used, the grilling pan is easy to shake on the housing on all sides, thus making it unsafe to use.

SUMMARY OF THE INVENTION

The present invention is provided with a safe handle unit of a detachable grilling pan, which overcomes the disadvantages of the existing technology.

The technical proposal of the present invention to solve the technical problem is as below:

A handle unit of a detachable grilling pan, comprising:
a lock element, which is disposed in the body of the grill; and
a handle module, which is disposed in the grilling pan of the grill;
thereinto, the handle module comprising a housing, a lock catch element and a repositioning element, the lock catch element is movably forward and backward laterally disposed inside the housing, one end of the lock catch element is disposed with a catch portion, the catch portion extends out of the housing, the repositioning element abuts against the lock catch element and the housing therebetween, the catch portion is locked to the lock element.

In another preferred embodiment, the lock element is a hook, the catch portion is a through hole disposed in the lock catch element, the hook passes through the through hole and is then locked to the edge of the through hole.

In another preferred embodiment, the top end face of the hook is inclined.

In another preferred embodiment, the lock catch element is disposed with a guiding pole, the guiding pole is disposed inside the through hole and is connected to the edge of the through hole, the repositioning element is sleeved on the guiding pole.

In another preferred embodiment, the lock catch element is disposed with a guiding pole, the guiding pole is connected to the other end of the lock catch element, the repositioning element is sleeved on the guiding pole.

In another preferred embodiment, the lock element is a protruding edge disposed in the body of the grill, the catch portion extends into the body of the grill to lock to the protruding edge.

In another preferred embodiment, the lock catch element is disposed with a guiding pole, the guiding pole is connected to the other end of the lock catch element, the repositioning element is sleeved on the guiding pole.

In another preferred embodiment, the housing comprising an upper cover and a lower cover, the upper cover and the lower cover covers the repositioning element.

In another preferred embodiment, the repositioning element is a spring.

In another preferred embodiment, the handle module further comprising a button, the button is connected to the other end of the lock catch element and is communicated with the outside.

Compared to the existing technology, the technical proposal of the present invention has advantages as below:
1. the lock catch element is movably forward and backward laterally disposed inside the housing, one end of the lock catch element is disposed with a catch portion, the catch portion extends out of the housing, the repositioning element abuts between the lock catch element and the housing, the catch portion is locked to the lock element, thus avoiding the scald resulting from that the grilling pan shakes on all sides, so that it is used safe. To disassemble the grilling pan, pressing the lock catch element laterally to detach the hook and the lock catch element, it is provided with simple structure and easy operation.
2. the lock element is a hook, the catch portion is a through hole disposed in the lock catch element, the hook passes through the through hole to lock to the edge of the though hole, thus making the locking of the lock element and the lock catch element stable.
3. the top end face of the hook is inclined, to assemble the grilling pan, thus making the top end face of the hook sliding smoothly through the edge of the through hole, thus making it easy to assemble.
4. the lock element is a protruding edge disposed in the body of the grill, the catch portion extends into the body of the grill to lock to the protruding edge, thus making handle unit with less elements, thus making it with simple structure.
5. the handle module further comprising a button, with the button, it is convenient to press the lock catch element laterally, thus making it easy to operate.

BRIEF DESCRIPTION OF THE DRAWINGS

The present invention will be further described with the drawings and the embodiments.

DETAILED DESCRIPTION OF THE EMBODIMENTS

The First Embodiment

Figure 1:
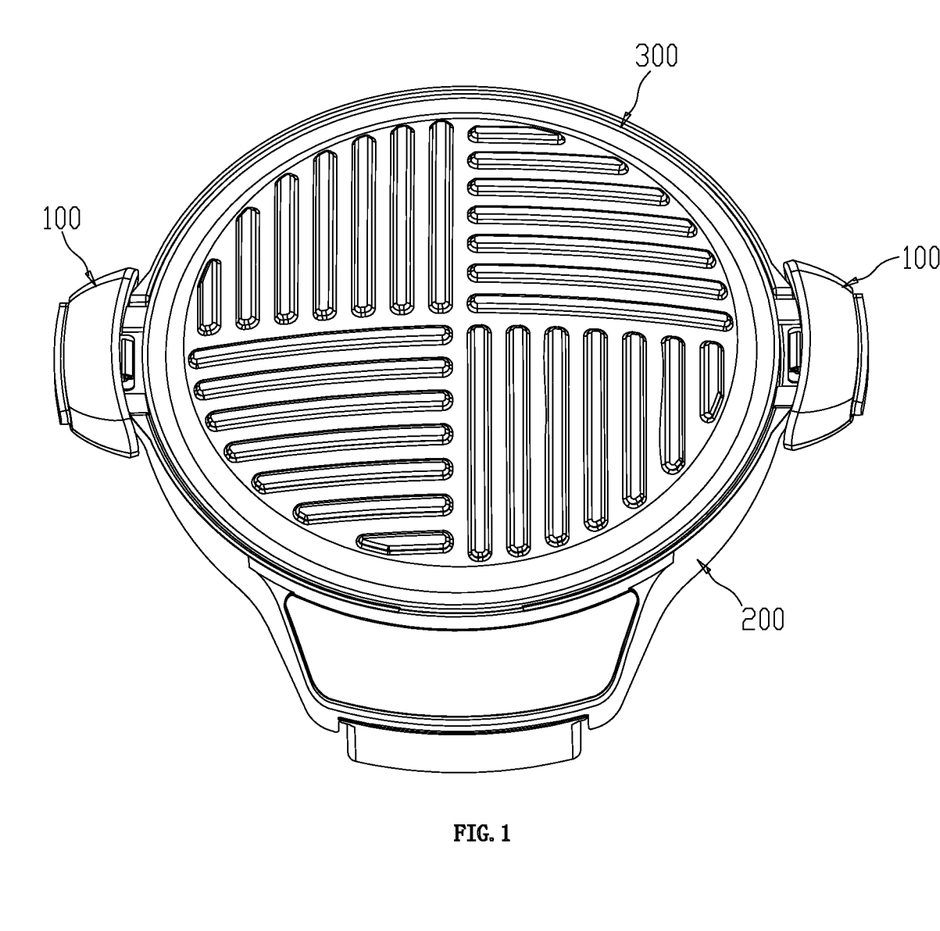
FIG. 1 illustrates a schematic diagram of a grill applied with a handle unit of a detachable grilling pan of a first embodiment of the present invention.
Figure 2:
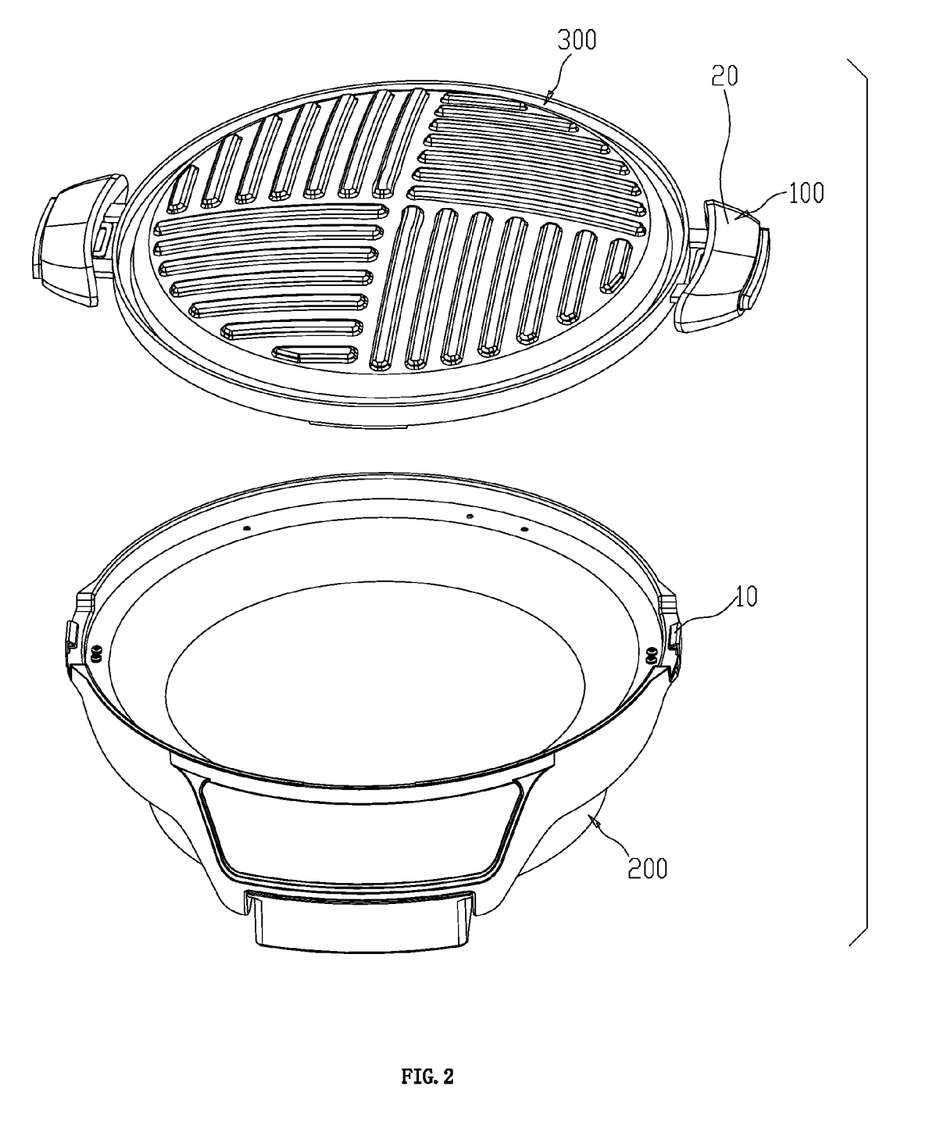
FIG. 2 illustrates an exploded diagram of the grill of FIG. 1.

Please refer to FIG. 1 and FIG. 2, a handle unit 100 of a detachable grill of the present invention is disposed in the body 200 and the grilling pan 300, the handle unit 100 is used to make the grilling pan 300 freely assembled or disassembled to the body 200, thus avoiding the scald resulting from the grilling pan 300.

The handle unit 100 of a detachable grilling pan comprising a lock element 10 and a handle module 20, the lock element 10 is disposed in the body 200 of the grill; the handle module 20 is disposed in the grilling pan 300 of the grill.

Figure 3:
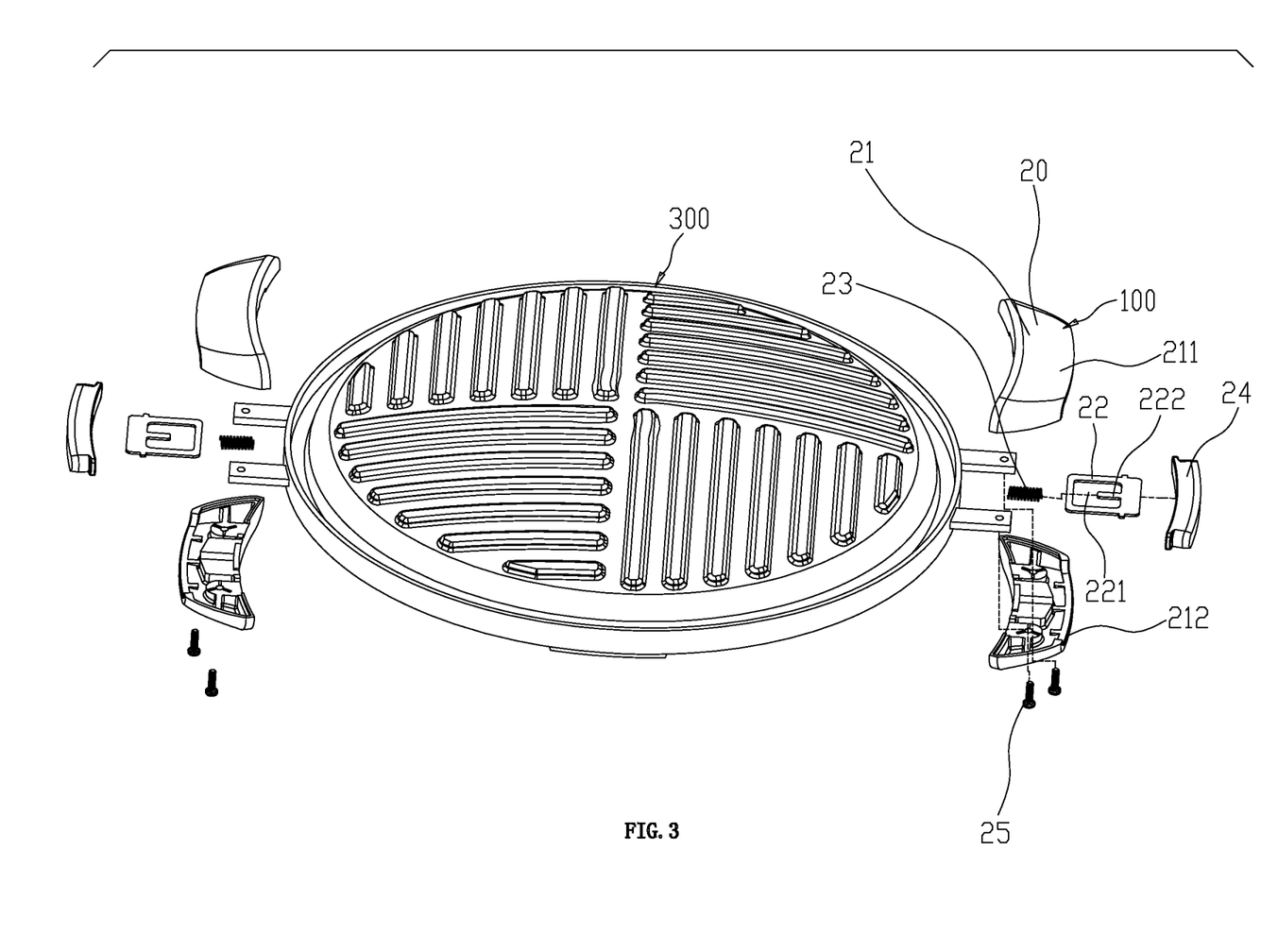
FIG. 3 illustrates an exploded diagram of the grilling pan and the handle module of FIG. 1.
Figure 4:
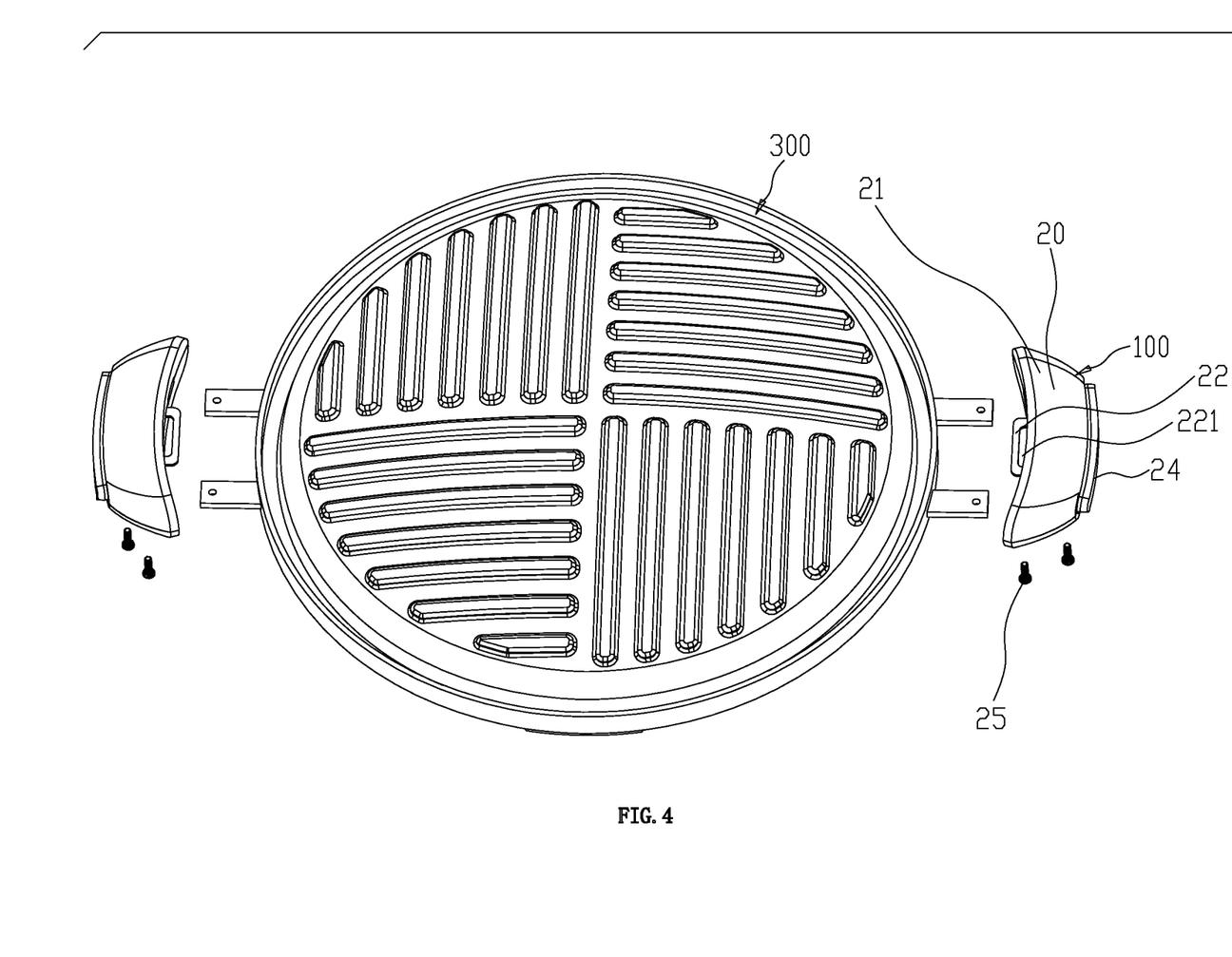
FIG. 4 illustrates another exploded diagram of the grilling pan and the handle module of FIG. 1.
Figure 5:
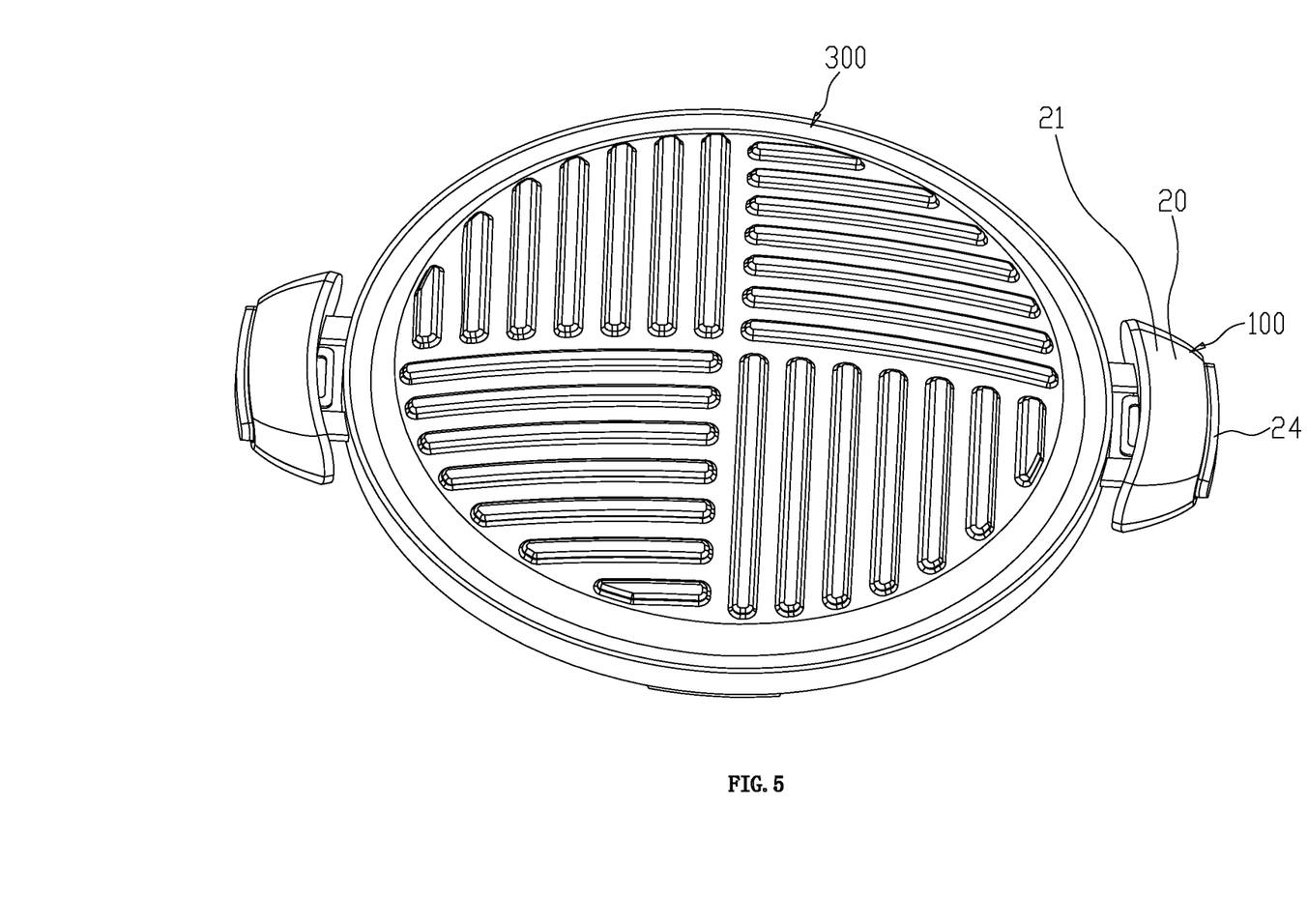
FIG. 5 illustrates a schematic diagram of the grilling pan and the handle module of FIG. 1.
Figure 6:
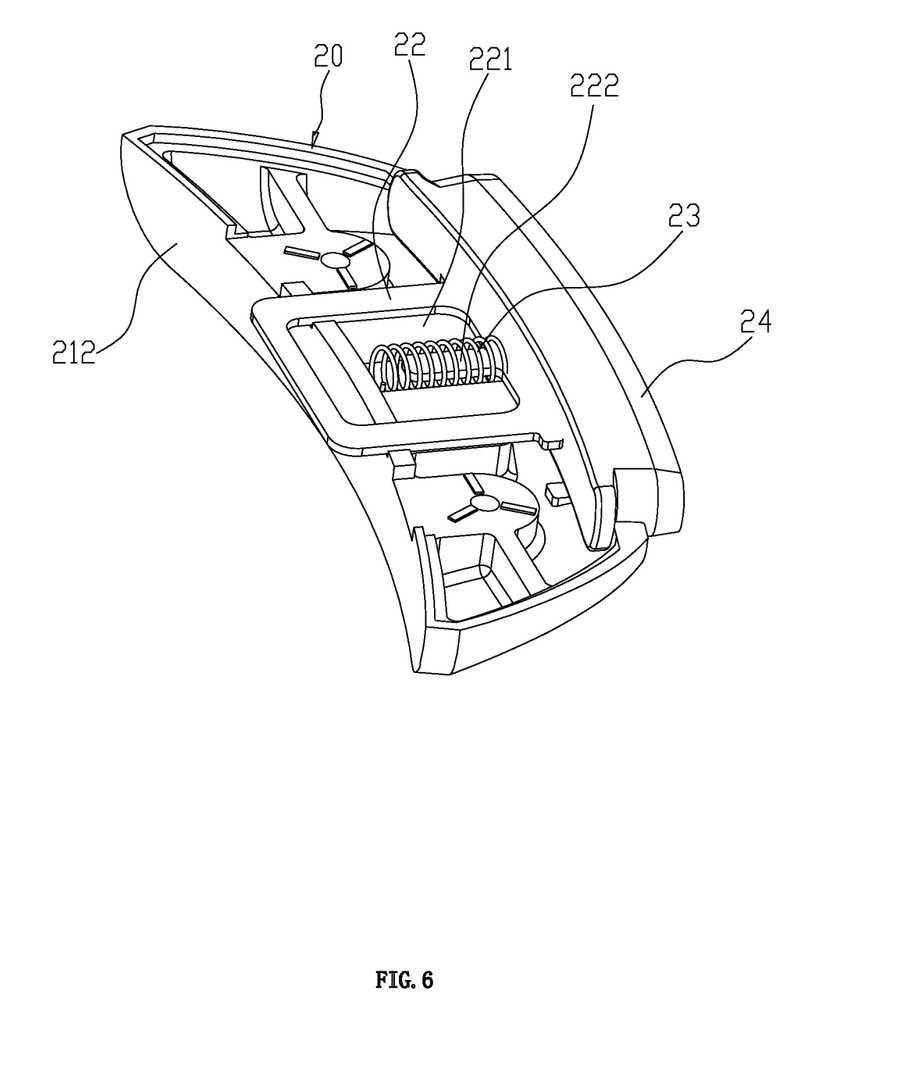
FIG. 6 illustrates a schematic diagram of the handle module (without the upper cover) of FIG. 1.

Please refer to FIG. 3 to FIG. 5, the handle module 20 comprising a housing 21, a lock catch element 22, a repositioning element 23 and a button 24. The housing 21 comprising an upper cover 211 and a lower cover 212. One end of the lock catch element 22 is disposed with a catch portion 221, which is a through hole in the lock catch element 22. The lock catch element 22 is disposed with a guiding pole 222, the guiding pole 222 is disposed inside the through hole 221 and is connected to the edge of the rear end of the through hole 221. The repositioning element 23 is preferred a spring.

Please refer to FIG. 3 to FIG. 6 and FIG. 7, the spring 23 is sleeved on the guiding pole 222; the button 24 is connected to the rear end of the lock catch element 22; the upper cover 211 and the lower cover 212 covers the spring 23 and the lock catch element 22; the repositioning element 23 abuts against between the lock catch element 22 and the housing 21, the lock catch element 22 is movably forward and backward laterally disposed inside the housing 21 and the front end of the through hole 221 extends out of the housing 21; the button 24 is communicated with the outside; the handle module 20 is locked to the edge of the grilling pan 300 by screw 25.

Figure 7:
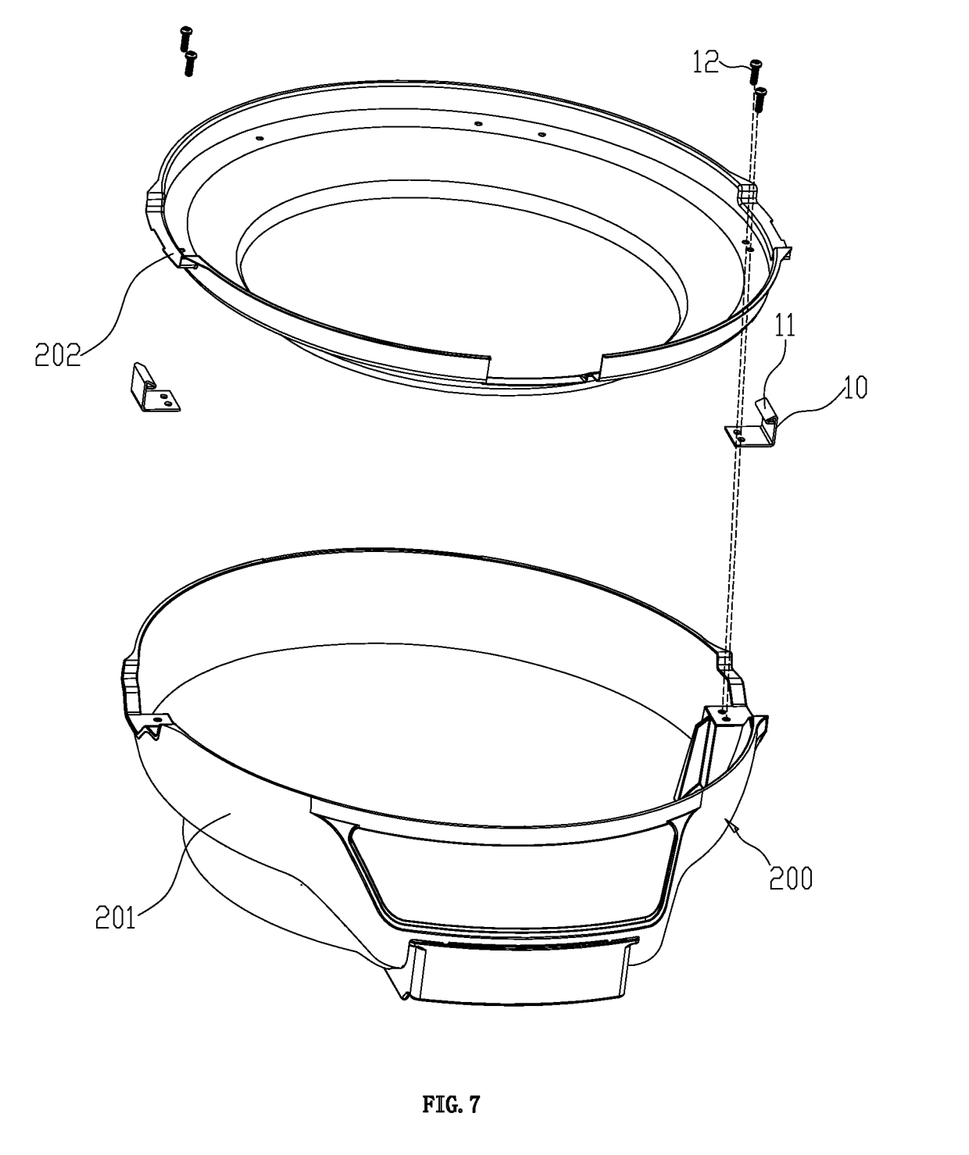
FIG. 7 illustrates an exploded diagram of the body and the lock element of FIG. 1.
Figure 8:
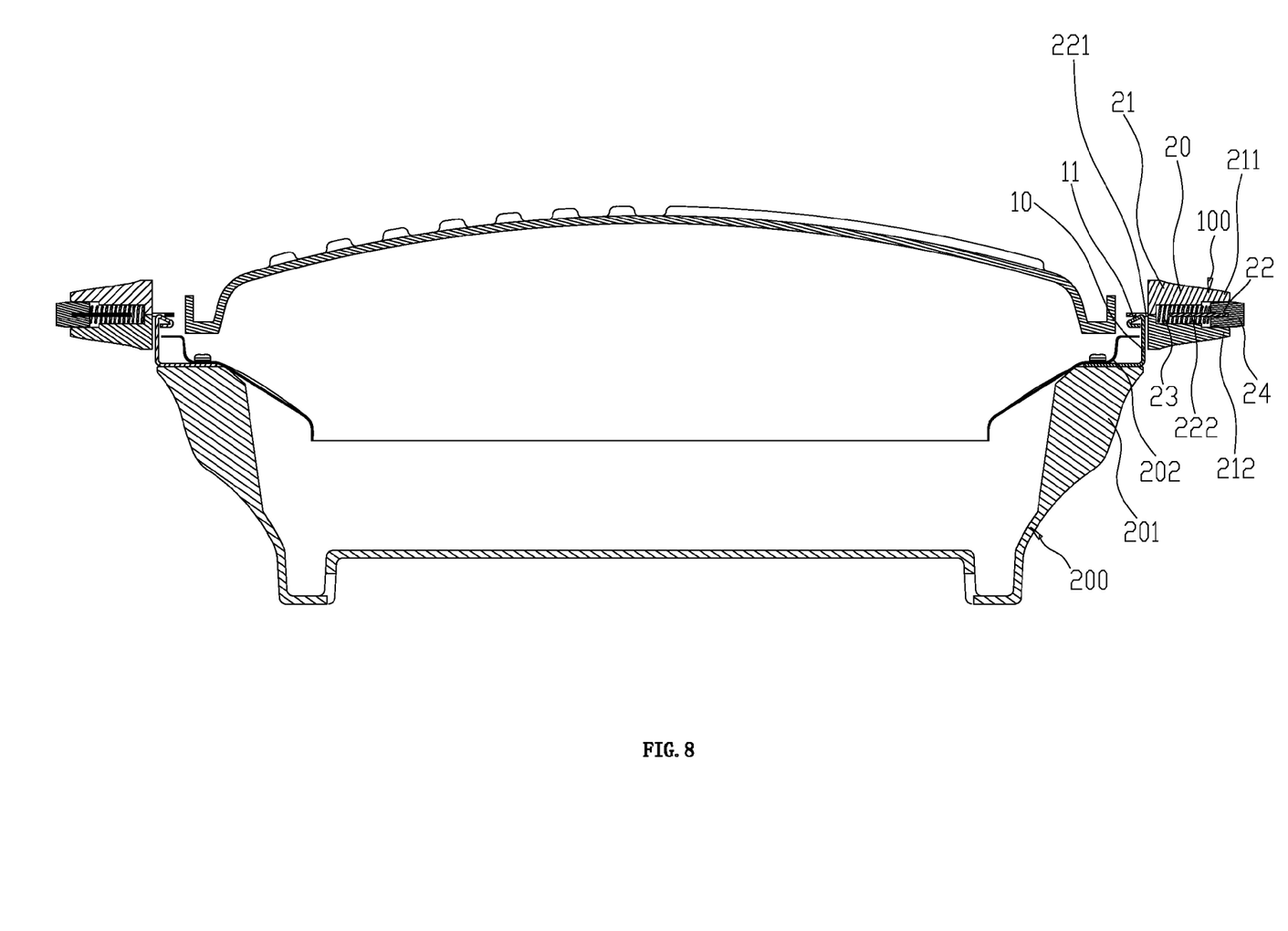
FIG. 8 illustrates a sectional view of the lock element and the handle module of FIG. 1 before locking.
Figure 9:
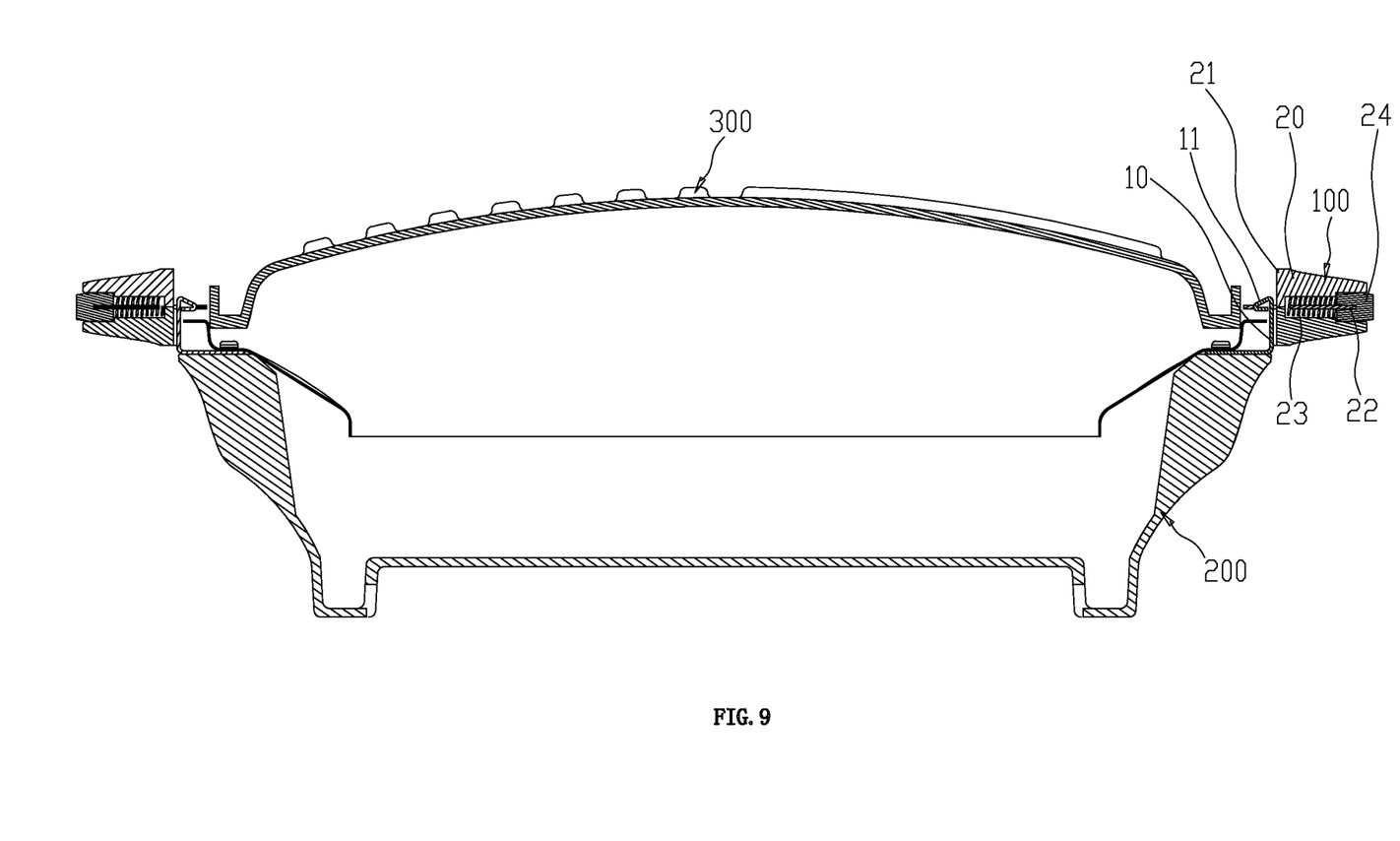
FIG. 9 illustrates a sectional view of the lock element and the handle module of FIG. 1 in locking process.
Figure 10:
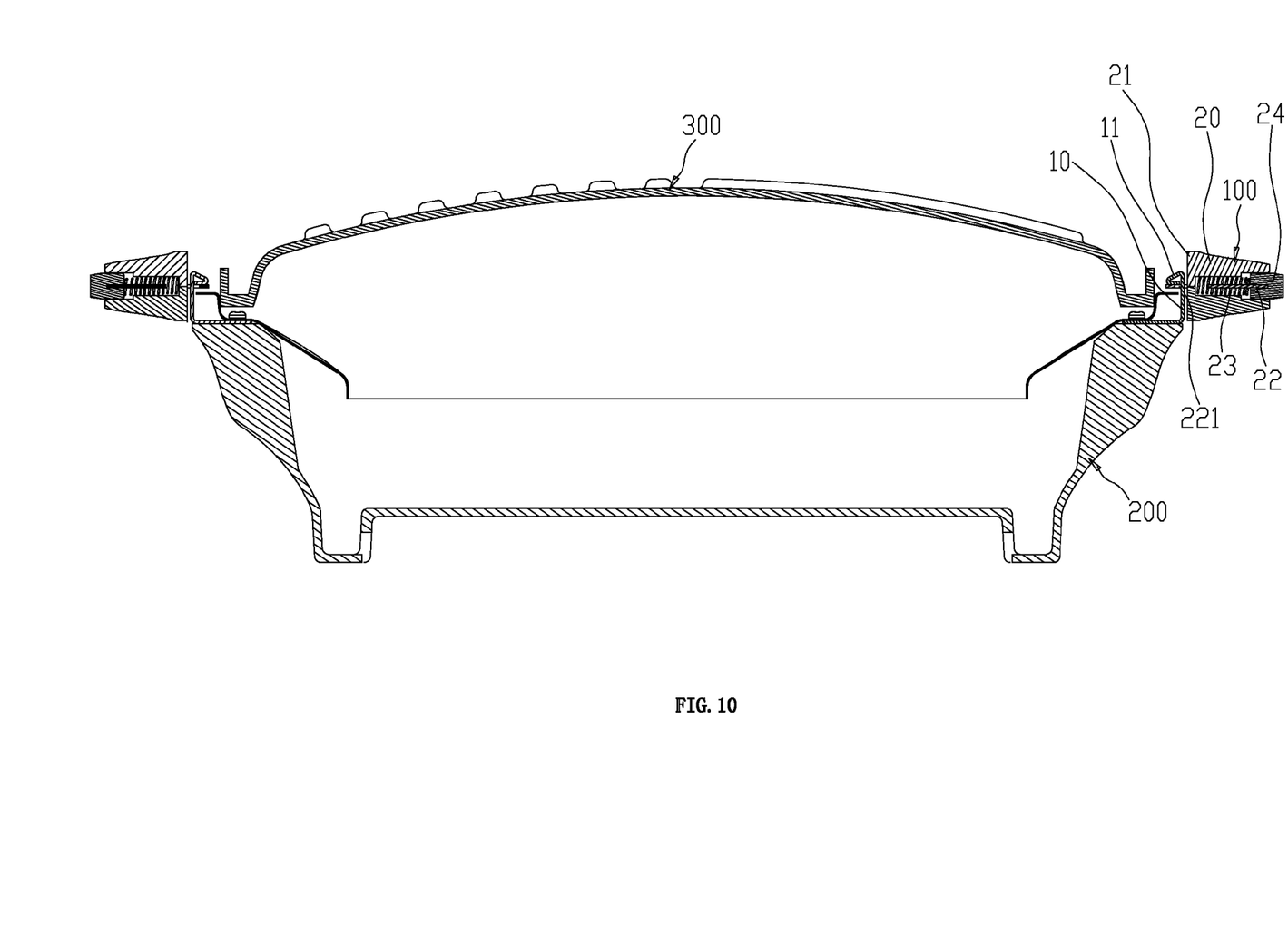
FIG. 10 illustrates a sectional view of the lock element and the handle module of FIG. 1 being locked together.
Figure 11:
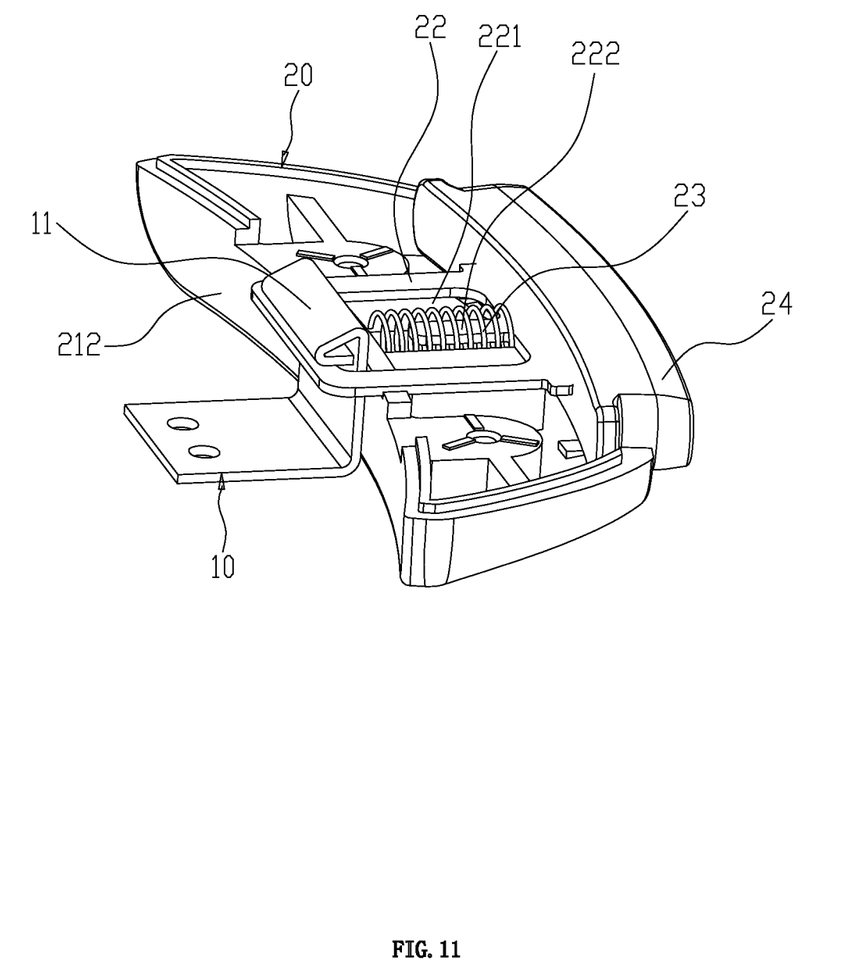
FIG. 11 illustrates a schematic diagram of the lock element and the handle module (without the upper cover) of FIG. 1 being locked together.

Please refer to FIG. 7, the lock element 10 is a hook, the hook 10 is generally L shaped, the top end face 11 thereof is inclined.

Please refer to FIG. 2 and FIG. 7, the body 200 comprising a shell 201 and a reflector 202. The shell 201, the hook 10, the reflector 202 are locked together by screw 12, the hook 10 is disposed between the shell 201 and the reflector 202 and is situated in the edge of the shell 201.

Please refer to FIG. 8 to FIG. 11, to assemble the grilling pan 300 to the body 200: pressing the handle module 20 vertically down, the top end face 11 of the hook 10 abuts the edge of the through hole 221 of the lock catch element 22, the lock catch element 22 compresses the reposition element 23 to move toward the grilling pan 300 laterally, the hook 10 passes through the through hole 221, the repositioning element 23 abuts the lock catch element 22, the lock catch element 22 moves away from the grilling pan 300 laterally, finally the hook 10 is locked to the edge of the through hole 221.

Figure 12:
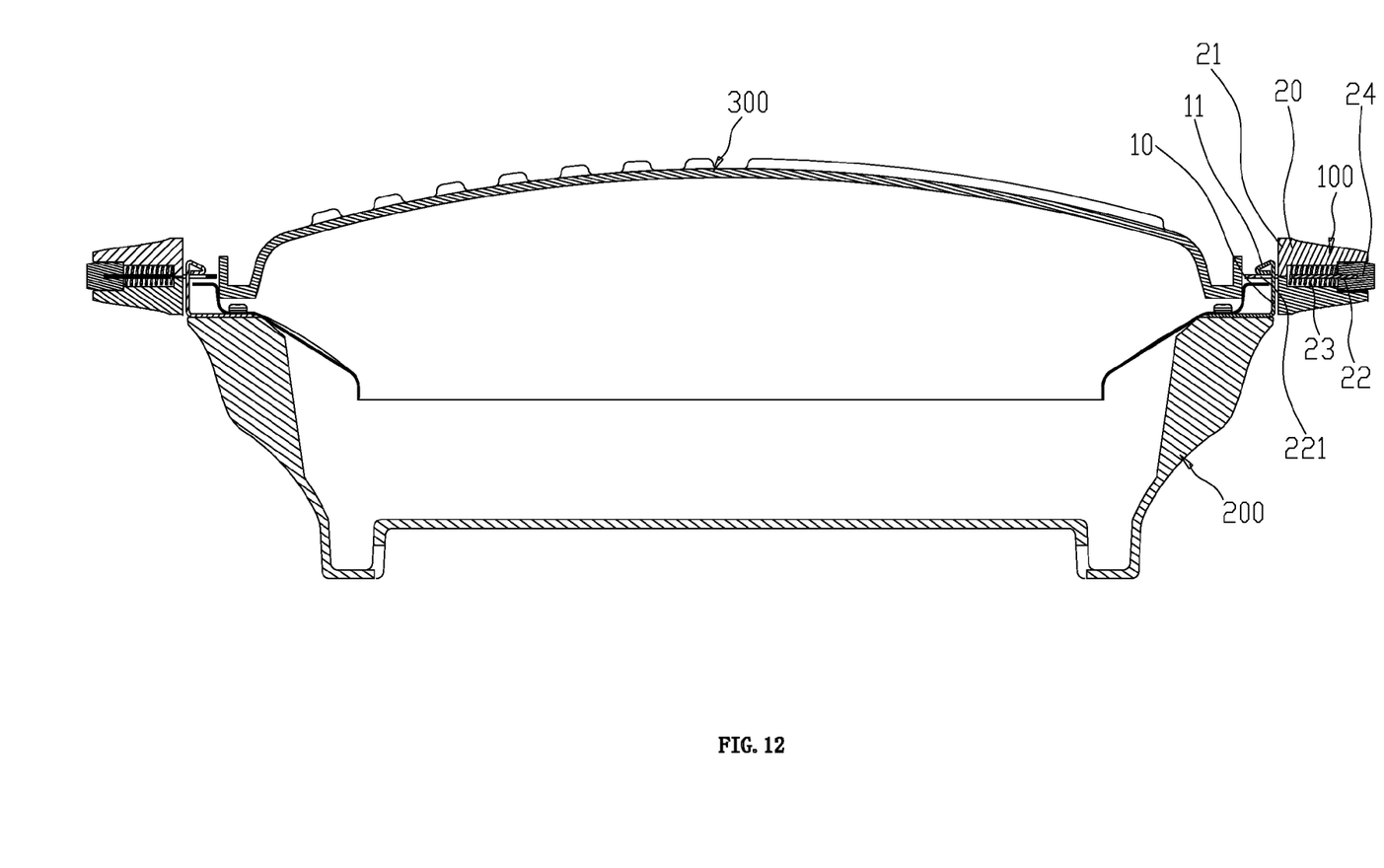
FIG. 12 illustrates a sectional view of the lock element and the handle module of FIG. 1 being detached.

Please refer to FIG. 12, to disassemble the grilling pan 300 from the body 200: pressing the button 24 laterally, the lock catch element 22 overcomes the elastic force of the repositioning element and moves toward the grilling pan laterally, the hook 10 is detached from the edge of the through hole 221, then lifting the grilling pan 300 up.

The Second Embodiment

Figure 13:
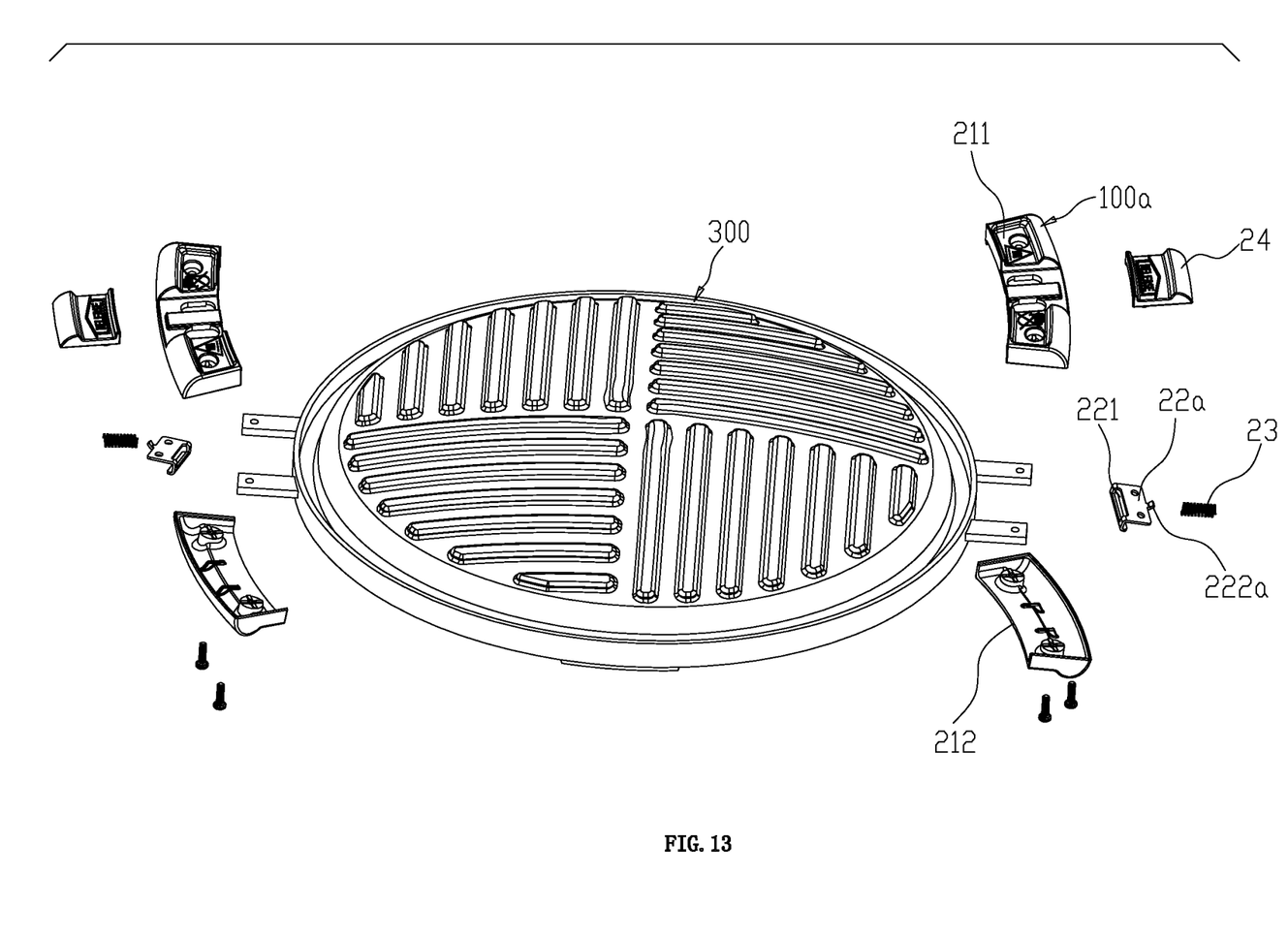
FIG. 13 illustrates an exploded diagram of the grilling pan and the handle module of a grill applied with a handle unit of a detachable grilling pan of a second embodiment of the present invention.
Figure 14:
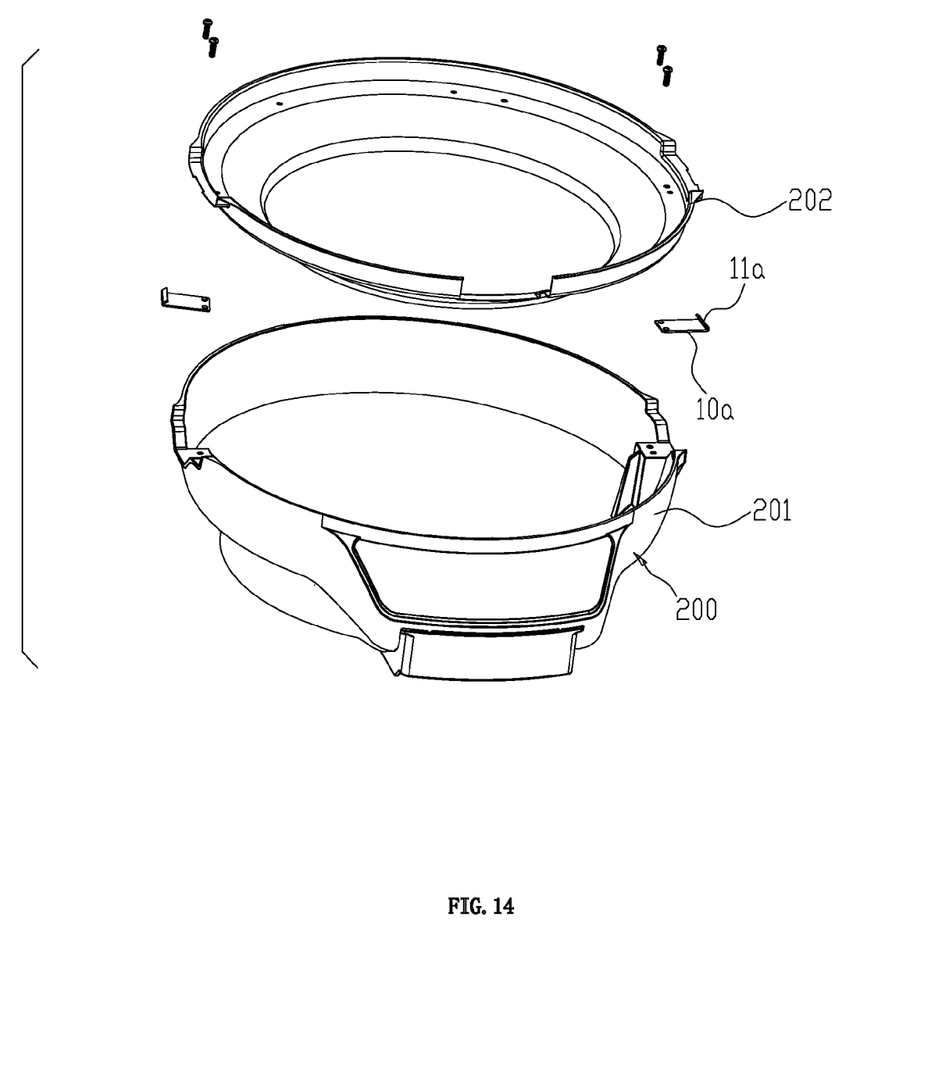
FIG. 14 illustrates an exploded diagram of the body and the lock element of a grill applied with a handle unit of a detachable grilling pan of the second embodiment of the present invention.

Please refer to FIG. 13 and FIG. 14, the difference of a handle unit 100a of a detachable grilling pan of this embodiment from the first embodiment is that: one end of the lock catch element 22a is hook shaped, the hook portion 221, also the through hole 221 is situated in one end of the lock catch element 22a; the guiding pole 222a is connected to the other end of the lock catch element 22a, the spring 23 is sleeved on the guiding pole 222a. To assemble the grilling pan 300 to the body: inserting the top end face 11a of the lock catch element 10a into the through hole 221 of the lock catch element 22a.

The Third Embodiment

Figure 15:
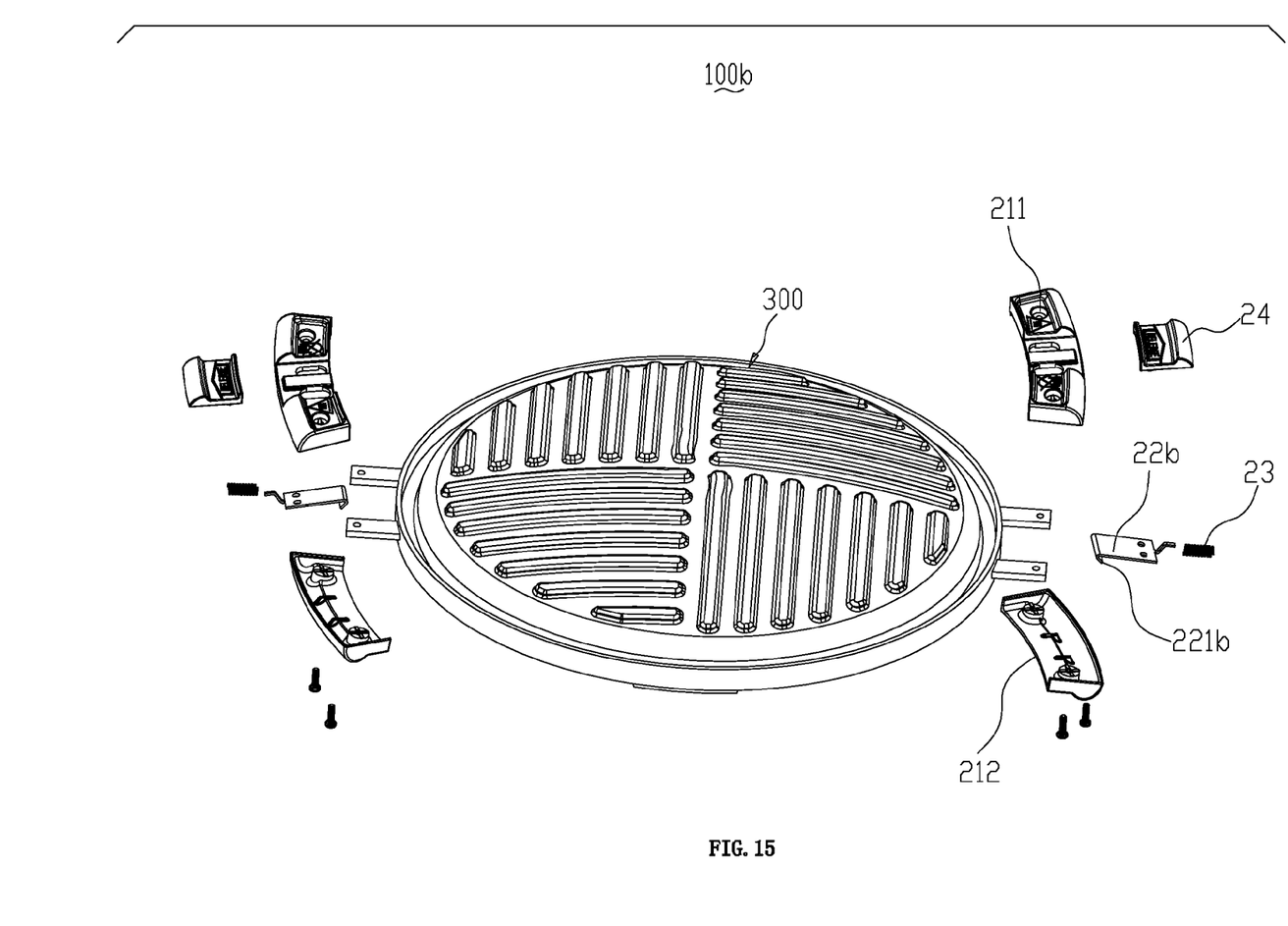
FIG. 15 illustrates an exploded diagram of the grilling pan and the handle module of a grill applied with a handle unit of a detachable grilling pan of a third embodiment of the present invention.

Please refer to FIG. 15, the difference of a handle unit 100b of a detachable grilling pan of this embodiment from the second embodiment is that: the lock catch element (not figured out) is a protruding edge disposed in the body of the grill, the protruding edge can be disposed on the internal wall of the shell. The catch portion 221b of the lock catch element 22b is hook shaped. To assemble the grilling pan 300 to the body: inserting the catch portion 221b from the clearance of the shell and the reflector into the body of the grill to lock to the protruding edge.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A handle unit of a detachable grilling pan, comprising:
a lock element, which is disposed in the body of the grill, the lock element being a hook; and
a handle module, which is disposed in the grilling pan of the grill;
thereinto, the handle module comprising a housing, a lock catch element and a repositioning element, the lock catch element is movably forward and backward laterally disposed inside the housing, one end of the lock catch element is disposed with a catch portion, the catch portion being a through hole disposed in the lock catch element, the catch portion extends out of the housing, the repositioning element abuts against the lock catch element and the housing therebetween, the catch portion being locked to the lock element by having the hook pass through the through hole and then locked to an edge of the through hole.

2. The handle unit of a detachable grilling pan according to claim 1, wherein top end face of the hook is inclined.

3. The handle unit of a detachable grilling pan according to claim 2, wherein the housing comprising an upper cover and a lower cover, the upper cover and the lower cover covers the repositioning element.

4. The handle unit of a detachable grilling pan according to claim 2, wherein the repositioning element is a spring.

5. The handle unit of a detachable grilling pan according to claim 1, wherein the lock catch element is disposed with a guiding pole, the guiding pole is disposed inside the through hole and is connected to the edge of the through hole, the repositioning element is sleeved on the guiding pole.

6. The handle unit of a detachable grilling pan according to claim 1, wherein the lock catch element is disposed with a guiding pole, the guiding pole is connected to the other end of the lock catch element, the repositioning element is sleeved on the guiding pole.

7. The handle unit of a detachable grilling pan according to claim 1, wherein the housing comprising an upper cover and a lower cover, the upper cover and the lower cover covers the repositioning element.

8. The handle unit of a detachable grilling pan according to claim 1, wherein the repositioning element is a spring.

9. The handle unit of a detachable grilling pan according to claim 1, wherein the handle module further comprising a button, the button is connected to the other end of the lock catch element and is communicated with the outside.

10. The handle unit of a detachable grilling pan according to claim 1, wherein the housing comprising an upper cover and a lower cover, the upper cover and the lower cover covers the repositioning element.

11. The handle unit of a detachable grilling pan according to claim 1, wherein the repositioning element is a spring.

12. The handle unit of a detachable grilling pan according to claim 1, wherein the handle module further comprising a button, the button is connected to the other end of the lock catch element and is communicated with the outside.

* * * * *